United States Patent [19]

Hunter

[11] Patent Number: 4,705,727

[45] Date of Patent: Nov. 10, 1987

[54] COMPOSITE MATERIAL FOR INDUCTION HEATING

[75] Inventor: James R. Hunter, McMurray, Pa.

[73] Assignee: Pfizer Inc., New York, N.Y.

[21] Appl. No.: 786,423

[22] Filed: Oct. 11, 1985

[51] Int. Cl.[4] .................... B32B 15/10; B32B 15/00
[52] U.S. Cl. .................................... 428/653; 428/683; 126/390; 99/422
[58] Field of Search ............... 428/653, 683; 126/390; 59/422

[56] References Cited

U.S. PATENT DOCUMENTS

| | | | |
|---|---|---|---|
| 2,764,805 | 10/1956 | Mears | 29/196.1 |
| 3,650,710 | 3/1972 | Doucerain | 29/196.2 |
| 3,966,426 | 6/1976 | McCoy et al. | 29/196.2 |
| 4,004,892 | 1/1976 | Ulam | 29/196.2 |
| 4,103,076 | 7/1978 | Ulam | 428/653 |
| 4,167,606 | 9/1979 | Ulam | 428/653 |
| 4,246,045 | 1/1981 | Ulam | 148/11.5 Q |
| 4,526,842 | 7/1985 | Eide | 428/617 |
| 4,533,807 | 8/1985 | Minnamida | 219/10.49 R |
| 4,564,001 | 1/1986 | Maeda | 126/390 |

FOREIGN PATENT DOCUMENTS 707562 5/1941 Fed. Rep. of Germany .
1157711 7/1969 United Kingdom .

Primary Examiner—John L. Goodrow
Assistant Examiner—Patrick J. Ryan
Attorney, Agent, or Firm—Charles J. Knuth

[57] ABSTRACT

A composite material comprising a layer of ferritic stainless steel of up to 0.005 inches thickness covered on both sides by a layer of austenitic stainless steel of up to 0.005 inches thickness and suitable for induction heating. A second composite material comprising the material above further bonded to an aluminum layer and another layer of austenitic stainless steel. Cookware made of both types of composite material.

12 Claims, 2 Drawing Figures

LOW POWER

COMPOSITE MATERIAL FOR INDUCTION HEATING

BACKGROUND OF THE INVENTION

For many years efforts have been made to develop useable, satisfactory induction heating systems for use in cooking operations. Although the desirability of using induction heating for cooking food and the like has long been recognized, up until fairly recent times induction heating systems have been employed for this type of purpose only very infrequently. The reasons for this are complex and to an extent have to do with consumer resistance possibly related to the heavy cooking utensils previously required for induction cooking.

Ideally, cookware should be lightweight, mechanically strong, corrosion resistant, easy to clean, quick and even heating, wear resistant, of a pleasing appearance and low in cost. To achieve these goals, aluminum and stainless steel has frequently been employed but while both have certain advantages both also suffer disadvantages.

When in addition to the above considerations induction heating capability is taken into account, the problem becomes even more complex. For induction heating to occur, the cookware must be magnetic, at least in part. Thus both aluminum and the non-magnetic stainless steel cannot be used for induction cooking. Cast iron can be used for induction heating cookware but it offers no corrosion resistance, offers uneven heating and is heavy.

Various attempts have been made to overcome these problems using layered or laminated cookware. For example, U.S. Pat. No.3,966,426 teaches a multilayer cookware having a relatively thick,, magnetic, layer to develop the power, a layer of high-thermal conductivity material and a low-magnetic layer. U.S. Pat. No. 3,650,710 attempts to solve the problems using a structure of stainless steel, aluminum and a phosphor-nickel layer.

The present invention, for the first time, solves all of the problems inherent in designing a material for cookware suitable for being induction heated. In particular, the materials of this invention have superior corrosion resistance and they are light in weight.

SUMMARY OF THE INVENTION

The present invention comprises a composite material suitable for induction heating comprising:
 (a) a layer of magnetic ferritic stainless steel of a thickness of up to about 0.005 inches; and
 (b) on each side of said magnetic layer, a layer of non-magnetic, austenitic stainless steel of a thickness of up to about 0.005 inches.

The material wherein the magnetic layer is of T-409 stainless steel of a thickness of between about 0.0045 and 0.005 inches is preferred as is the material wherein the non-magnetic layers are each of T-304 stainless steel of a thickness between about 0.004 and 0.005 inches.

An especially preferred composite material suitable for induction heating comprises:
 (a) a first layer of non-magnetic austenitic stainless steel having two faces and designed to be placed in close proximity to a magnetic induction coil and having a thickness of up to 0.005 inches,
 (b) a second layer of magnetic, ferritic stainless steel bonded to the face of said first layer farthest from said induction coil and having a thickness of up to 0.005 inches;
 (c) a third layer of non-magnetic, austenitic stainless steel bonded to said second layer and having a thickness of up to 0.005 inches;
 (d) a fourth layer of aluminum bonded to said third layer and having a thickness of up to 0.200 inches; and
 (e) a fifth layer of non-magnetic, austenitic stainless steel bonded to said fourth layer.

The material wherein the fourth layer is a triple-ply aluminum layer comprising a core of aluminum alloy covered on each side by essentially pure aluminum, the triple-ply layer having a thickness of from about 0.020–0.200 inches is preferred as is the material wherein' the first and third layers are each of T-304 stainless steel having a thickness between about 0.004 and 0.005 inches. The material wherein the second layer is of T-409 stainless steel having a thickness between about 0.0045 and 0.005 inches is also preferred as is the material wherein the fifth layer is of T-304 stainless steel having a thickness between about 0.010 and 0.015 inches. The material wherein the aluminum alloy is selected from aluminum 3003 or 3004 and wherein the essentially pure aluminum is of from 99.0–99.75% purity is especially preferred.

A final part of this invention comprises cookware made from any of the material described above.

DETAILED DESCRIPTION OF THE INVENTION

Figure 1:
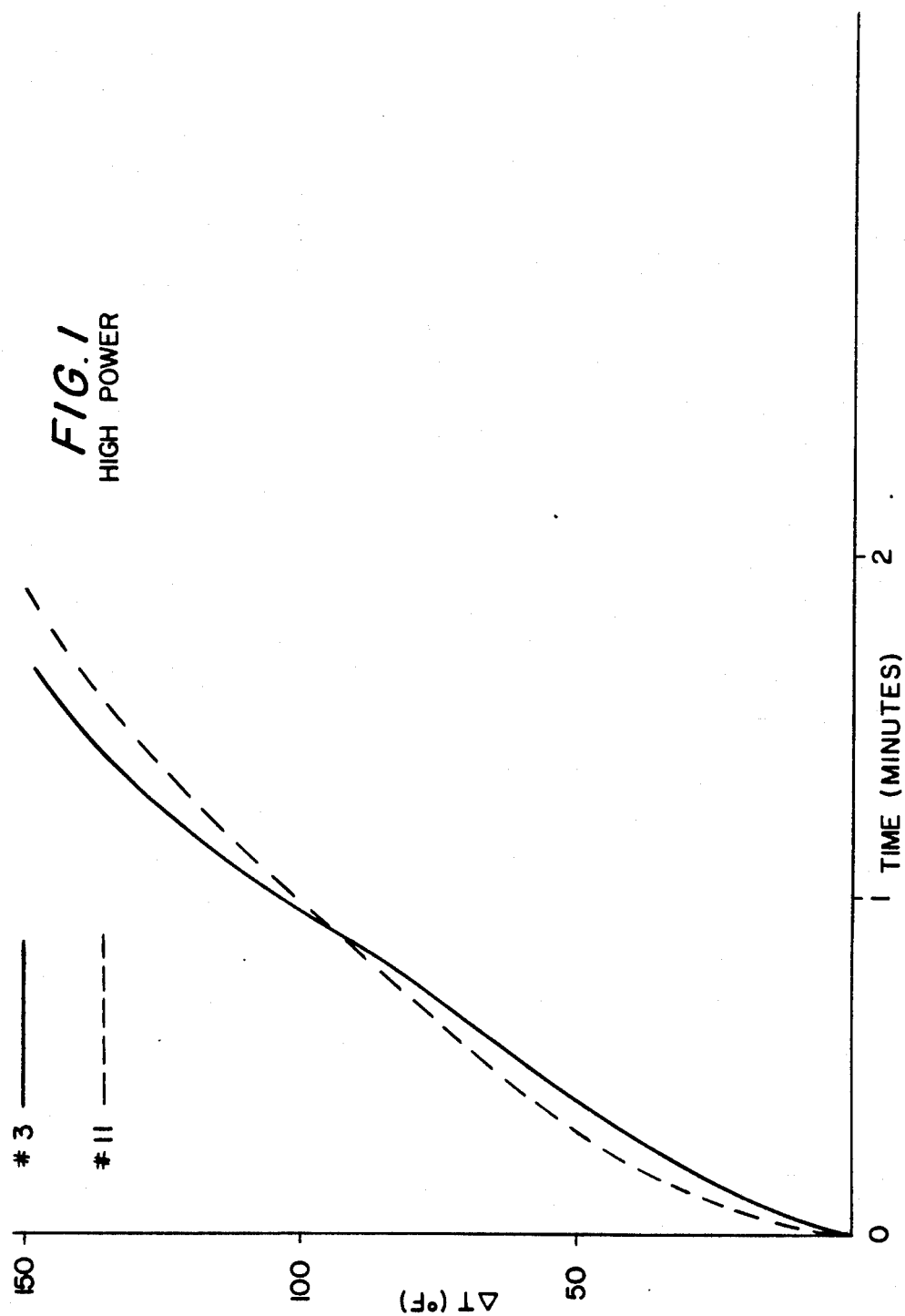

The manufacture of the induction cookware material of this invention is preferably carried out in two steps. First, a layer of ferritic stainless steel is sandwiched between two layers of austenitic stainless steel, all surfaces being cleaned before the layers are assembled into a pack configuration. It may at times be desirable to insert a layer of nickel on each side of the ferritic steel as the pack is formed to facilitate bonding. The layers are then assembled into a pack, preferably by sub arc welding. The pack is then subjected to vacuum and is heated and hot rolled to a coil. The coil is edge trimmed, annealed and cleaned and it is then cold rolled to further reduce the thickness. The annealing, cleaning and cold rolling may be repeated several times to achieve further reduction to the thickness desired. Generally a thickness of from about 0.0135–0.015 inches is desirable. All of the three layers are of a thickness of up to 0.005 inches. The thickness of the magnetic layer is particularly critical and is between about 0.0045 and 0.005 inches. This particular thickness of magnetic material gives maximum power with minimum weight. This material is suitable for the manufacture of induction-heating cookware by normal procedures. The material will usually be cut into blanks, pressed into molds and drawn into whatever shape is desired.

When desired, the material described above is further bonded to other layers to achieve a seven layer material for making induction heating cookware. In this case, the material will not be fully reduced in thickness since it will be further pinched as explained below. A thickness of up to 0.0165 inches is suitable. The material described above is brought into contact with a layer of aluminum triple ply material consisting of a core of aluminum alloy surrounded on both sides by essentially pure aluminum. Such aluminum triple-ply is commercially available or can be assembled in-house. The aluminum alloy is preferably alloy 3003 or 3004 and the pure aluminum is of 99.0–99.75% purity. The total thickness of aluminum triple-ply to be employed is from about 0.020–0.200 inches. A final layer of austenitic stainless steel of a thickness of between about 0.010 and 0.017 inches is placed on the aluminum triple-ply and the entire assemblage is passed into a furnace and then into a pinch mill to take a small reduction followed by a harder pinch to effect a further reduction. The bonded material is then annealed to increase the bond strength. It will be apparent to those skilled in the art that this material is assembled so that only a layer of austenitic stainless steel is between the induction coil and the layer of ferritic steel. The aluminum layer is on the side of the ferritic layer away from the coil and the final layer of austenitic steel forms the top or inside of the pan and comes in contact with the food being cooked.

Again, this material is suitable for manufacture into all types of induction heating cookware. The material generally will be cut into blanks, pressed into molds and drawn into shape as frying pans, pots, etc. by methods well known to the cookware industry.

The examples to follow are illustrative and are intended in no way to limit the claims which follow.

EXAMPLE 1

A 2 inch thick layer of type 409 ferritic stainless steel was cleaned on both faces and placed between two layers of cleaned, 2 inch thick type 304 austenitic stainless steel. This assemblage was then sub arc welded into a pack and the pack was subjected to vacuum to remove air and to enhance the seal. The pack as then heated and hot rolled into a coil of approximately 0.140 inches thickness. The coil was edge trimmed, annealed and cleaned and then cold rolled to approximately .0.070 inches thickness. The material was again cleaned and annealed and re-rolled down to a thickness of 0.035 inches. After a final annealing and cleaning, the material was finally reduced by cold rolling to a thickness of 0.015 inches.

This material was then cut into circular blanks, pressed into frying pan molds and drawn into final shape as frying pans for induction heating.

EXAMPLE 2

The material produced in Example 1 at a thickness of 0.0165 inch was brought into contact with a layer of commercially purchased aluminum triple-ply material of 0.069 and 0.095 inches thicknesses having an aluminum alloy core surrounded by layers of essentially pure aluminum. A layer of type 304 stainless steel of a thickness of approximately 0.017 inches was placed on the aluminum triple-ply layer and the entire assemblage was heated to approximately 650°–700° F. The materials were passed through a pinch mill to achieve a 1–3 percent reduction and then through the pinch mill again to achieve a 10–20 percent reduction to a final thickness of 0.090 and 0.110 inches respectively. The bonded material was then annealed at 650°–700° F. to develop the bond.

EXAMPLE 3

Seven ply material produced according to Example 2 was cut into circular blanks and pressed into frying pan molds. It was necessary to place the side wherein the type 409 stainless steel is separated from the surface by only one layer of types 304 stainless steel down, to form the bottom of the frying pan. The molded shapes were then drawn into frying pans and they were heated on an induction coil. The Table below describes one material of this invention and one control material having a carbon steel layer as the magnetic or power layer.

TABLE

| No. | Composition | Thickness (mils) | Total Thickness (mils) |
| --- | --- | --- | --- |
| 3 | 304/CS/304/Al/304 | 5/19/5/50/15 | 95 |
| 11 | 304/409/304/Al/304 | 4.9/4.69/5/83/15 | 112.59 |

Figure 2:
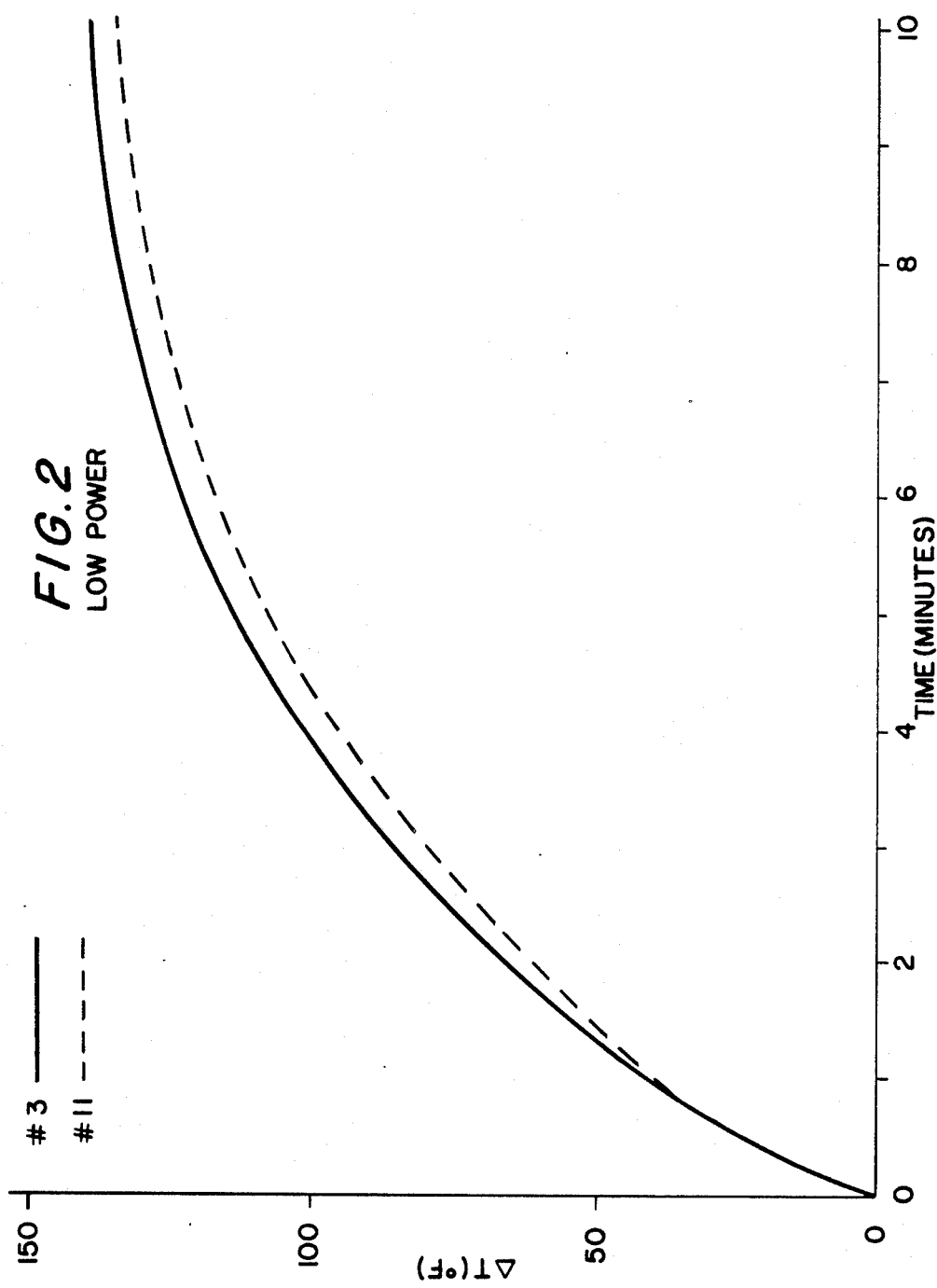

The seven ply pans described in the Table were heated by induction and heat characteristics observed are shown in FIGS. 1 and 2.

I claim:

1. A composite material suitable for induction heating comprising:
   (a) a layer of magnetic, ferritic stainless steel of a thickness of up to about 0.005 inches; and
   (b) on each side of said magnetic layer, a layer of non-magnetic, austenitic stainless steel of a thickness up to about 0.005 inches.

2. The material of claim 1 wherein said magnetic layer is of T-409 stainless steel of a thickness of between about 0.0045 and 0.005 inches.

3. The material of claim 1 wherein said non-magnetic layers are each of T-304 stainless steel of a thickness between about 0.004 and 0.005 inches.

4. A composite material suitable for induction heating comprising:
   (a) a first layer of non-magnetic austenitic stainless steel having two faces and designed to be placed in close proximity to a magnetic induction coil and having a thickness of up to 0.005 inches,
   (b) a second layer of magnetic, ferritic stainless' steel bonded to the face of said first layer farthest from said induction coil and having a thickness of up to 0.005 inches;
   (c) a third layer of non-magnetic, austenitic stainless steel bonded to said second layer and having a thickness of up to 0.005 inches;
   (d) a fourth layer of aluminum bonded to said third layer and having a thickness of up to 0.200 inches; and
   (e) a fifth layer of non-magnetic, austenitic stainless steel bonded to said fourth layer.

5. The material of claim 4 wherein said fourth layer is a triple-ply aluminum layer comprising a core of aluminum alloy covered on each side by essentially pure aluminum, said triple-ply layer having a thickness of from about 0.020–0.200 inches.

6. The material of claim 4 wherein said first and third layers are each of T-304 stainless steel having a thickness between about 0.004 and 0.005 inches.

7. The material of claim 4 wherein said second layer is of T-409 stainless steel having a thickness between about 0.0045 and 0.005 inches.

8. The material of claim 4 wherein said fifth layer is of T-304 stainless steel having a thickness between about 0.010 and 0.015 inches.

9. The material of claim 5 wherein said aluminum alloy is selected from aluminum 3003 or 3004.

10. The material of claim 5 wherein said essentially pure aluminum is of from 99.0–99.75% purity.

11. Cookware suitable for use in induction heating which is formed from the composite material of claim 1.

12. Cookware suitable for use in induction heating which is formed from the composite material of claim 4.

* * * * *